(12) United States Patent
Hu

(10) Patent No.: US 12,604,865 B2
(45) Date of Patent: Apr. 21, 2026

(54) OZONE PET WATER DISPENSER

(71) Applicant: Jiaquan Hu, Hunan Province (CN)

(72) Inventor: Zhenggen Hu, Hunan Province (CN)

(73) Assignee: Jiaquan Hu, Hunan Province (CN)

( * ) Notice: Subject to any disclaimer, the term of this patent is extended or adjusted under 35 U.S.C. 154(b) by 0 days.

(21) Appl. No.: 19/217,517

(22) Filed: May 23, 2025

(65) Prior Publication Data

US 2026/0101868 A1     Apr. 16, 2026

Related U.S. Application Data

(63) Continuation-in-part of application No. 18/930,175, filed on Nov. 13, 2024, now abandoned.

(30) Foreign Application Priority Data

Oct. 16, 2024     (CN) ......................... 202422506198.2

(51) Int. Cl.
*A01K 7/02*         (2006.01)
*C02F 1/78*         (2023.01)
(52) U.S. Cl.
CPC ............... *A01K 7/025* (2013.01); *A01K 7/027* (2013.01); *C02F 1/78* (2013.01)
(58) Field of Classification Search
CPC .......... A01K 7/02; A01K 7/022; A01K 7/025; A01K 7/027; A01K 7/04; A01K 7/06; C02F 1/4672; C02F 1/78
See application file for complete search history.

(56) References Cited

U.S. PATENT DOCUMENTS 11,291,183 B1 * 4/2022 Mayer ................. C02F 1/46109
2008/0190374 A1 * 8/2008 Farris .................... A01K 7/027
                                                              119/74
2008/0257272 A1 * 10/2008 Bolda .................... C02F 1/325
                                                              119/72

(Continued)

FOREIGN PATENT DOCUMENTS

CN         108464253 A   * 8/2018   ............... A01K 7/02
CN         108935171 A   * 12/2018  ............... A01K 7/02
         (Continued)

OTHER PUBLICATIONS

English translation (Year: 2024).*

(Continued)

*Primary Examiner* — David J Parsley
*Assistant Examiner* — Danielle A Clerkley

(57)               ABSTRACT

An ozone pet water dispenser including a main body, a control host, a pump body, a heating unit, and a hydrolytic ozone generator. The main body is formed with a storage chamber, a drinking trough, and a water return port respectively communicating with both the drinking trough and the storage chamber. The control host includes a housing mounted on the main body, a first circuit board and a switch unit disposed on the housing, with the switch unit electrically connected to the first circuit board. The pump body, electrically connected to the first circuit board, is activated by the first circuit board to pump water from the storage chamber to the drinking trough. Both the heating unit and hydrolytic ozone generator are electrically connected to the first circuit board.

19 Claims, 9 Drawing Sheets

(56)                  References Cited

U.S. PATENT DOCUMENTS

2023/0397573 A1 * 12/2023 Zou ......................... A01K 7/00

FOREIGN PATENT DOCUMENTS

| CN | 208175731 U | * | 12/2018 | ............... A01K 7/02 |
| CN | 217038395 U | * | 7/2022 | ............... A01K 7/02 |
| CN | 116918712 A | * | 10/2023 | ............ F04D 13/08 |
| CN | 118592350 A | * | 9/2024 | ................ C02F 1/32 |

OTHER PUBLICATIONS

English translation (Year: 2018).*
English translation (Year: 2023.*
English translation CN217038395U (Year: 2022).*

* cited by examiner

OZONE PET WATER DISPENSER

CROSS-REFERENCE TO RELATED APPLICATIONS

The application is a Continuation-in-Part of the U.S. application Ser. No. 18/930,175 filed on Nov. 13, 2024, and entitled "PET DRINKING WATER THERMOSTATIC DEVICE AND WATER STORAGE TANK" now pending, and also claims priority of Chinese Patent Application 2024225061982, filed on Oct. 16, 2024, the entire disclosures of which are incorporated herein by reference.

TECHNICAL FIELD

The present invention relates to the technical field of pet products, and in particular, to an ozone pet water dispenser.

BACKGROUND

Pet water dispensers are water circulation devices that generally include a water tank, a tray disposed on the water tank, and a pump connected to the water tank. When the pump operates, it draws water from the water tank to the tray, and when the water level in the tray reaches a certain height, excess water flows back into the water tank through holes in the tray, forming a water circulation structure. However, existing pet water dispensers have the following issues: in winter, the water temperature in the tank is too low, and pets drinking cold water may experience gastrointestinal discomfort, negatively impacting user experience. Additionally, current pet water dispensers typically use ultraviolet light for disinfection, which requires continuous exposure for over six hours to achieve sterilization. For water circulation devices, this means the UV lamp must remain constantly on, increasing power consumption and reducing battery life. Moreover, UV sterilization has low inactivation rates for bacterial spores and viruses, resulting in poor sterilization effectiveness.

SUMMARY

The primary objective of the present invention is to provide an ozone pet water dispenser that addresses the deficiencies of conventional UV sterilization in existing pet water dispensers, while also resolving the issue of gastrointestinal discomfort caused by pets consuming excessively cold water during winter.

In order to solve the technical problem, the technical scheme provided by the present invention is as follows.

An ozone pet water dispenser includes a main body, a control host, a pump body disposed on the main body and a hydrolytic ozone generator for sterilizing the liquid in the storage chamber.

The main body is internally provided with a storage chamber for storing liquid, and the main body is provided with a drinking trough for holding liquid and a water return port in communication with the drinking trough and the storage chamber.

The control host includes a housing assembled on the main body, and a first circuit board and a switch unit disposed on the housing, wherein the switch unit is electrically connected to the first circuit board.

The pump body is electrically connected to the first circuit board, and the pump body is activated when driven by the first circuit board to draw water from the storage chamber into the drinking trough.

The heating unit is electrically connected to the first circuit board and disposed on the main body.

The hydrolytic ozone generator is electrically connected to the first circuit board and disposed on the main body, and the first circuit board is configured to control at least one of the pump body, the heating unit, and the hydrolytic ozone generator in response to operation of the switch unit.

The present invention has the following beneficial effects. Compared with the prior art, the present embodiment employs the hydrolytic ozone generator to produce ozone for sterilizing the liquid in the chamber. Compared to ultraviolet sterilization, the ozone-based disinfection demonstrates faster bactericidal action and achieves higher inactivation rates against bacterial spores and viruses, thereby improving sterilization efficiency and enabling more rapid water purification, and unstable ozone readily reverts to oxygen, increasing the dissolved oxygen content in the water, and this provides pets with sterile, oxygen-enriched drinking water that significantly promotes their health. In the present embodiment, the ozone pet water dispenser is equipped with the heating unit for heating the liquid in the storage chamber, thereby preventing the dispenser from providing cold water to pets during winter that may cause gastrointestinal discomfort and improving the utilization rate of the ozone pet water dispenser. Additionally, the control host is independently arranged from the main body to facilitate testing of the control host and allow easy replacement when the first circuit board becomes damaged. The embodiment also includes the pump body and the water return port. When the pump body operates, it draws liquid from the storage chamber into the drinking trough. When the water level in the drinking trough reaches a predetermined height, water flows back into the storage chamber through the water return port, creating a circulating water flow that attracts pets to drink while ensuring they consume clean water.

BRIEF DESCRIPTION OF THE DRAWINGS

In order to explain the technical solutions of the embodiments of the present invention more clearly, the following will briefly introduce the accompanying drawings used in the embodiments. Apparently, the drawings in the following description are only some embodiments of the present invention. Those of ordinary skill in the art can obtain other drawings based on these drawings without creative work.

DETAILED DESCRIPTION OF THE EMBODIMENTS

Figure 1:
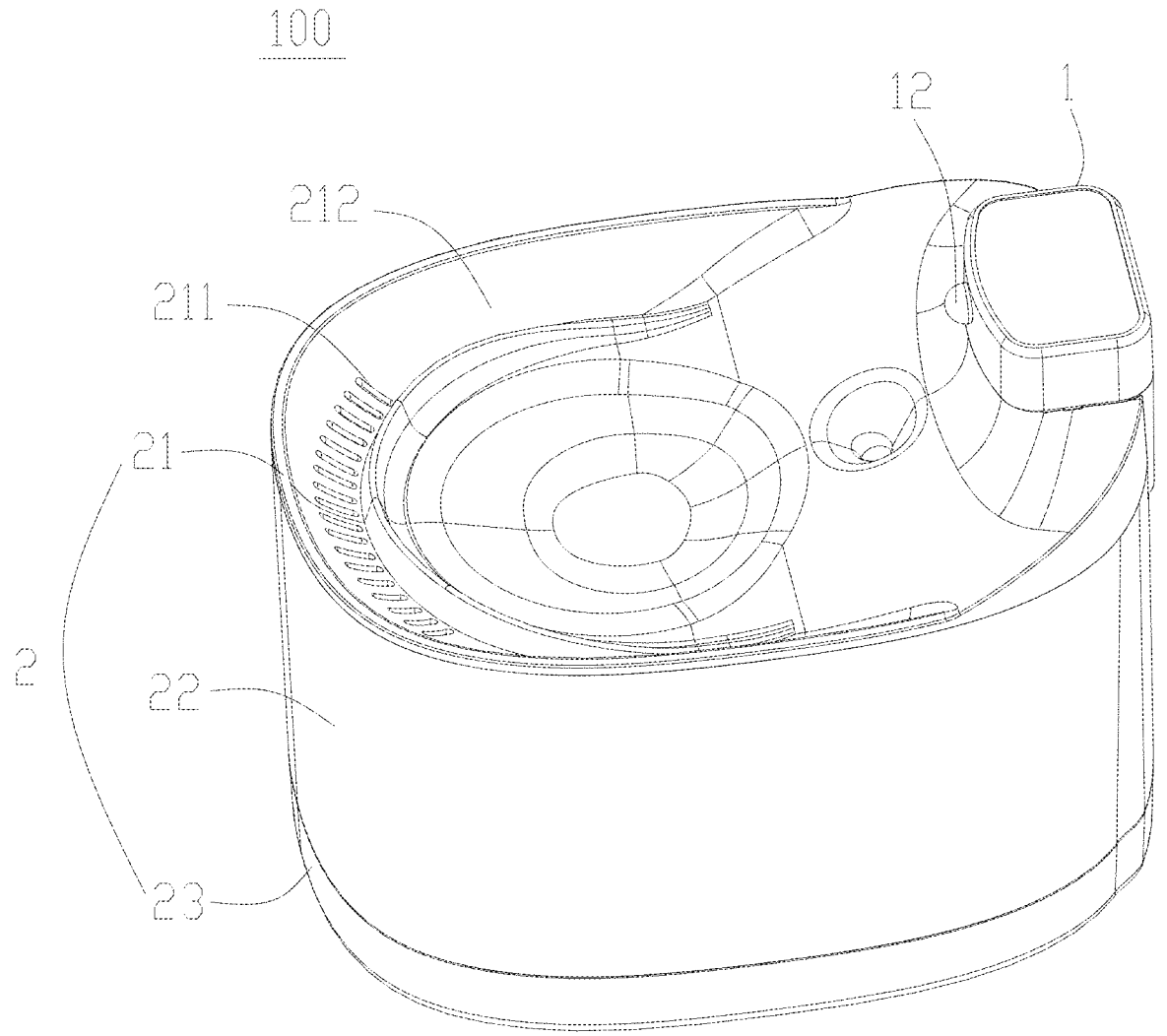
FIG. 1 is a perspective view of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "a plurality of" means two or more, unless otherwise specifically defined.

The terms "top", "bottom", and other indicating directions or positions are based on the directions or positions shown in the attached drawings in order to facilitate the description of the embodiment and simplify the description of the invention, rather than indicating or implying that the device or element referred to must have a specific orientation, be constructed and operated in a specific orientation, it cannot be understood as a limitation of the embodiment of the invention.

Figure 2:
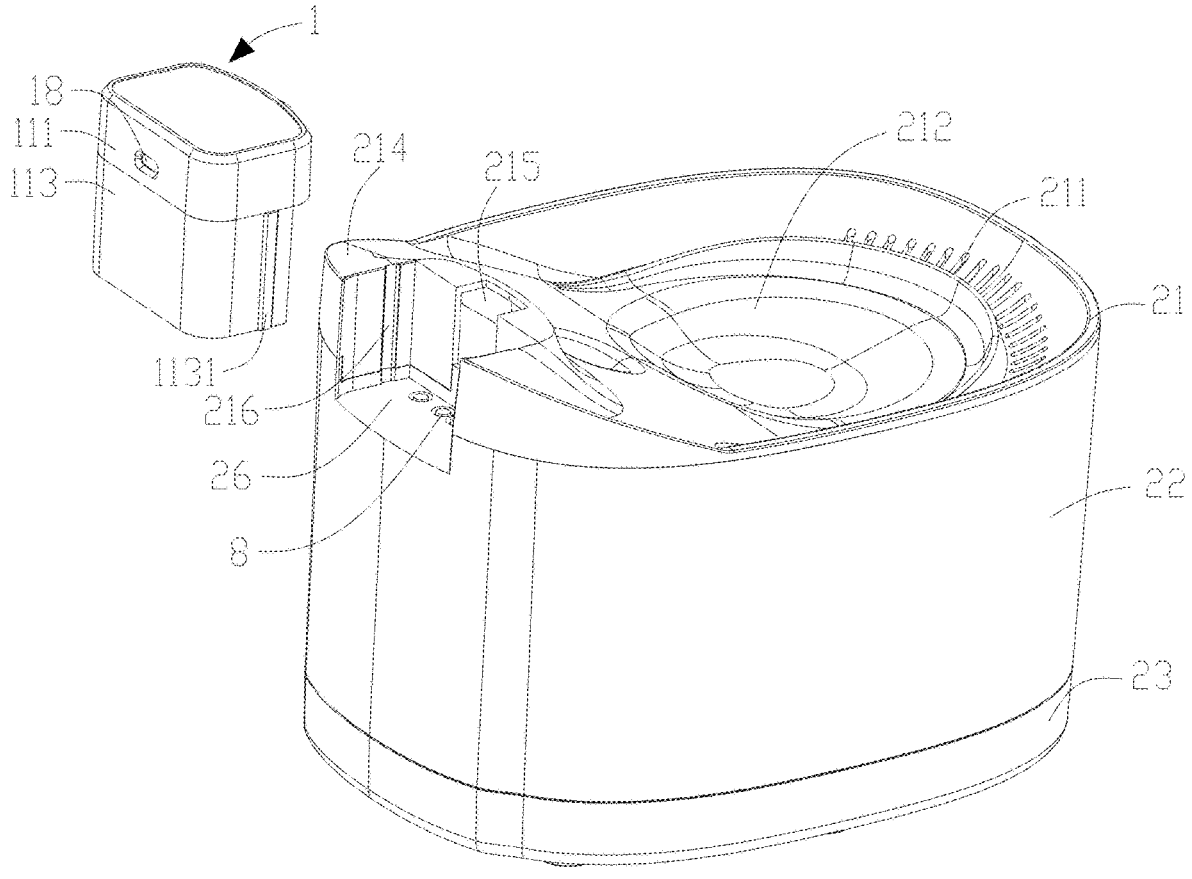
FIG. 2 is a partial exploded view of the present invention.
Figure 3:
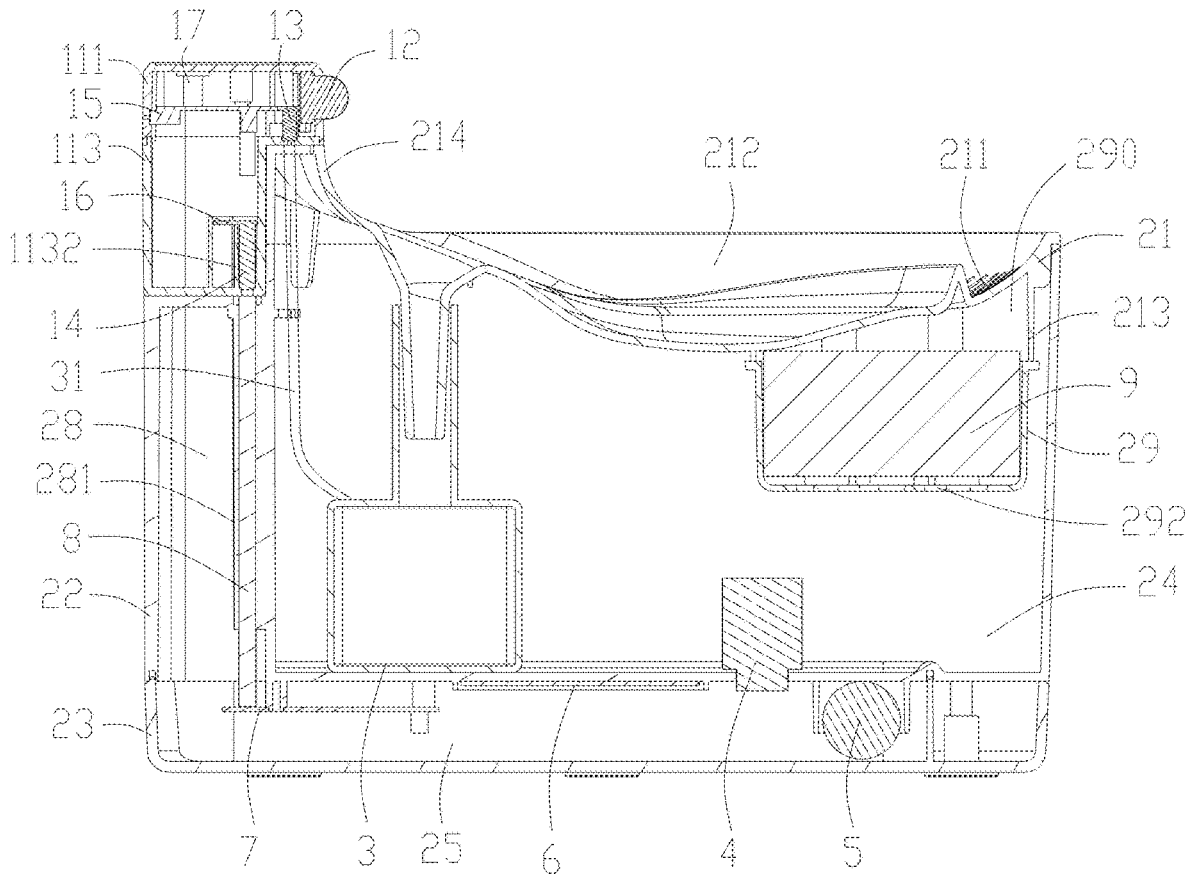
FIG. 3 is a cross-sectional view along the center of the pump body according to the present invention.
Figure 4:
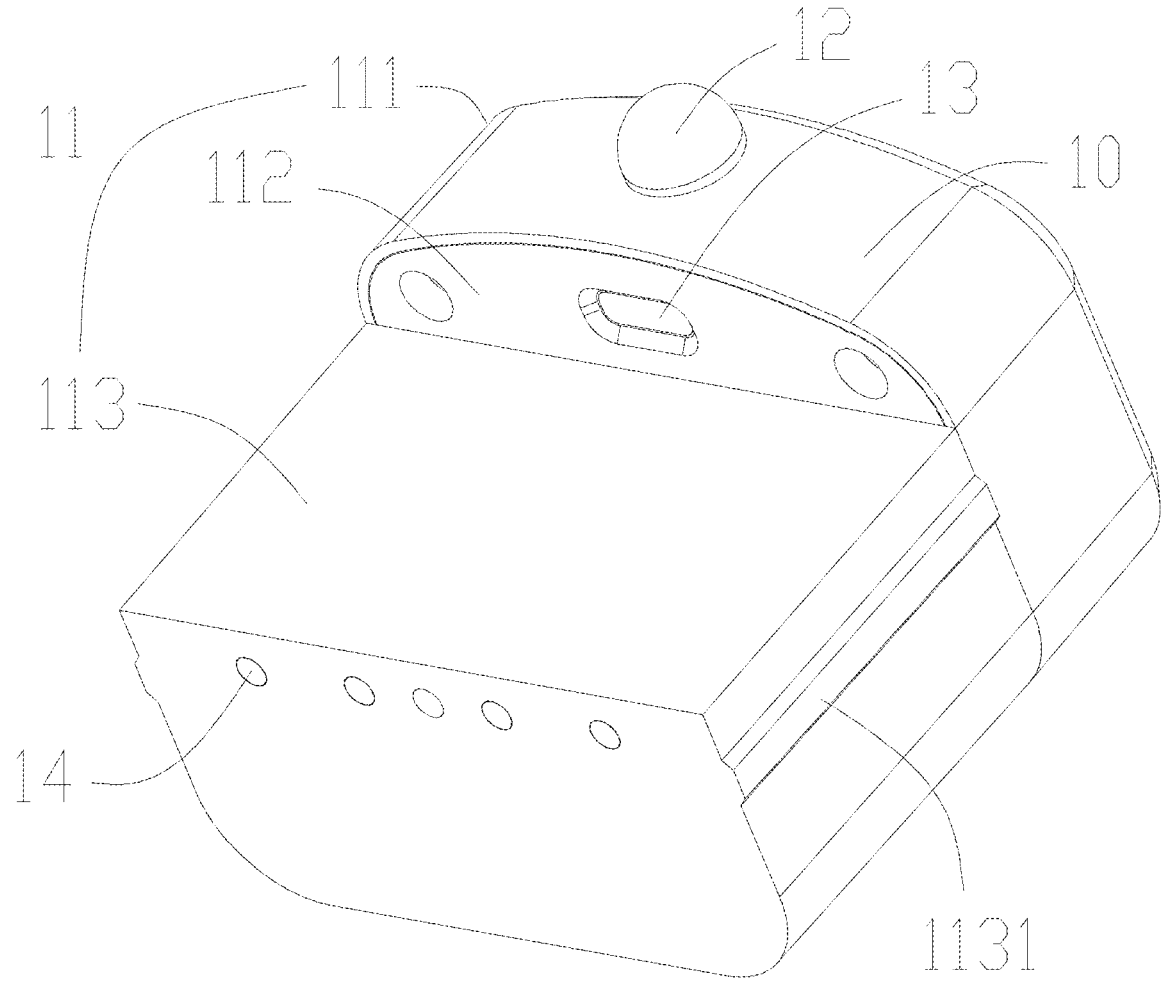
FIG. 4 is a perspective view of the control host according to the present invention.
Figure 5:
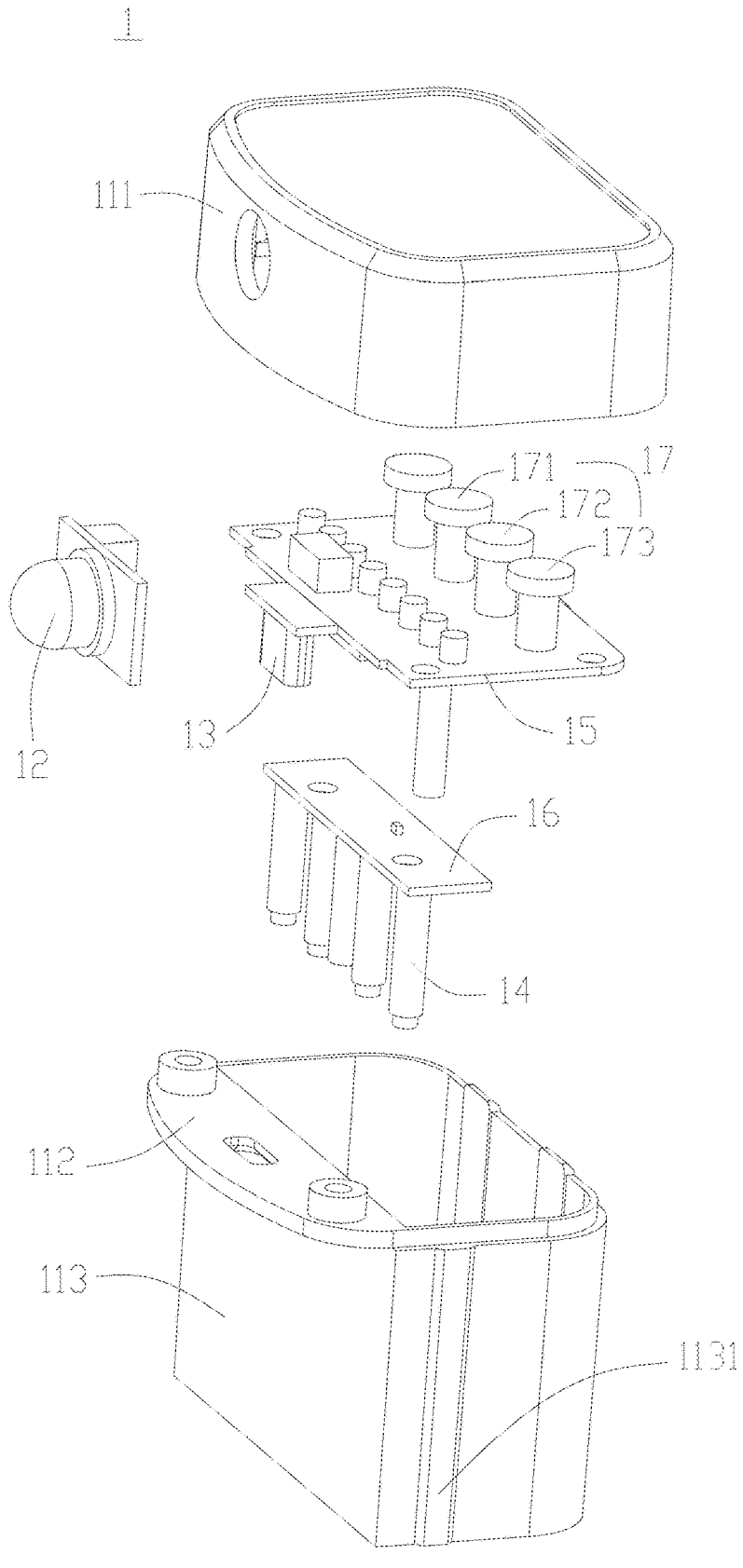
FIG. 5 is an exploded view of the control host according to the present invention.
Figure 6:
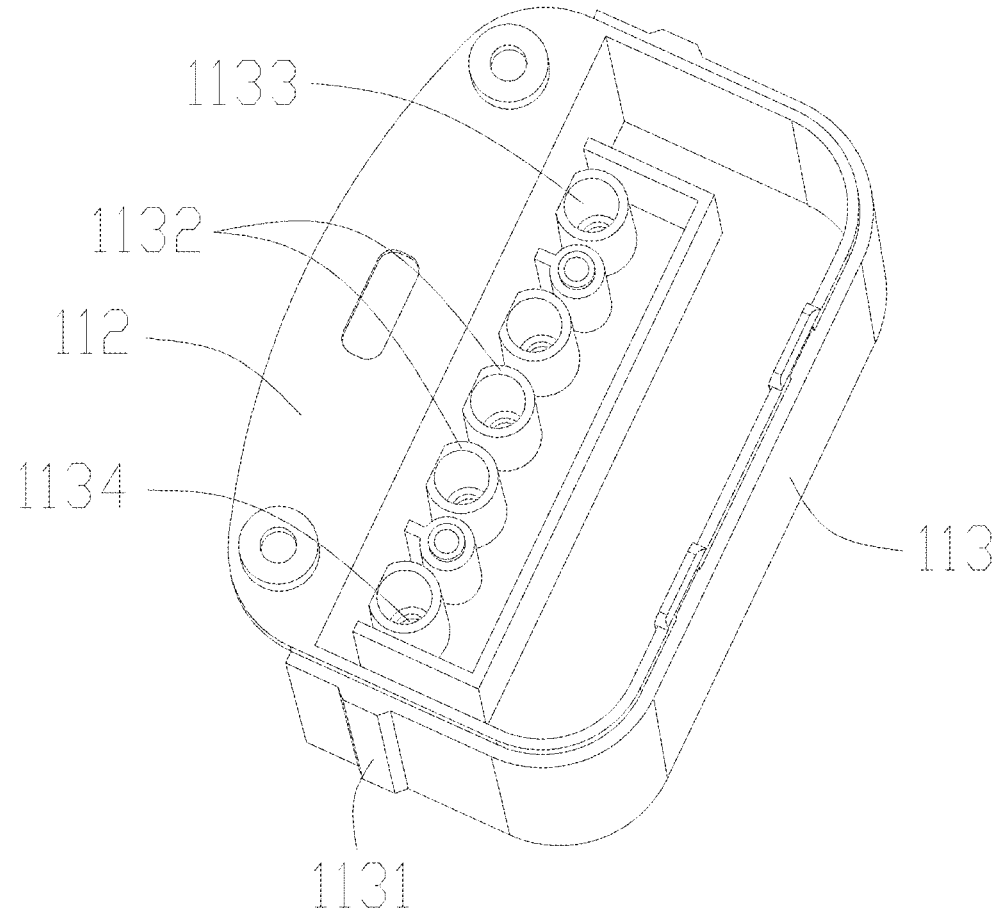
FIG. 6 is a structural view of the second bottom shell connected to the receiving panel according to the present invention.
Figure 7:
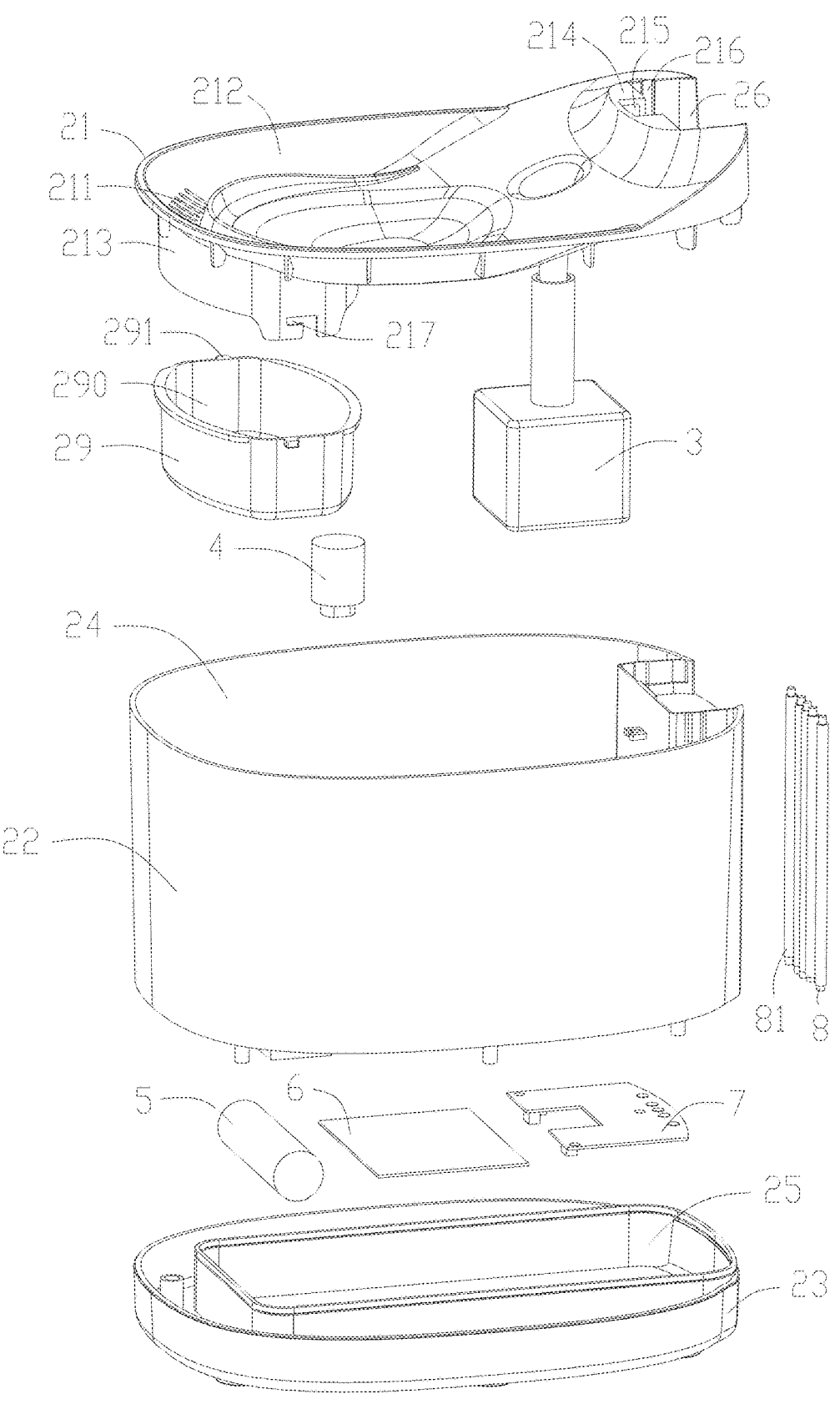
FIG. 7 is an exploded view with the control host removed according to the present invention.
Figure 8:
FIG. 8 is an exploded view from another perspective with the control host removed according to the present invention.
Figure 9:
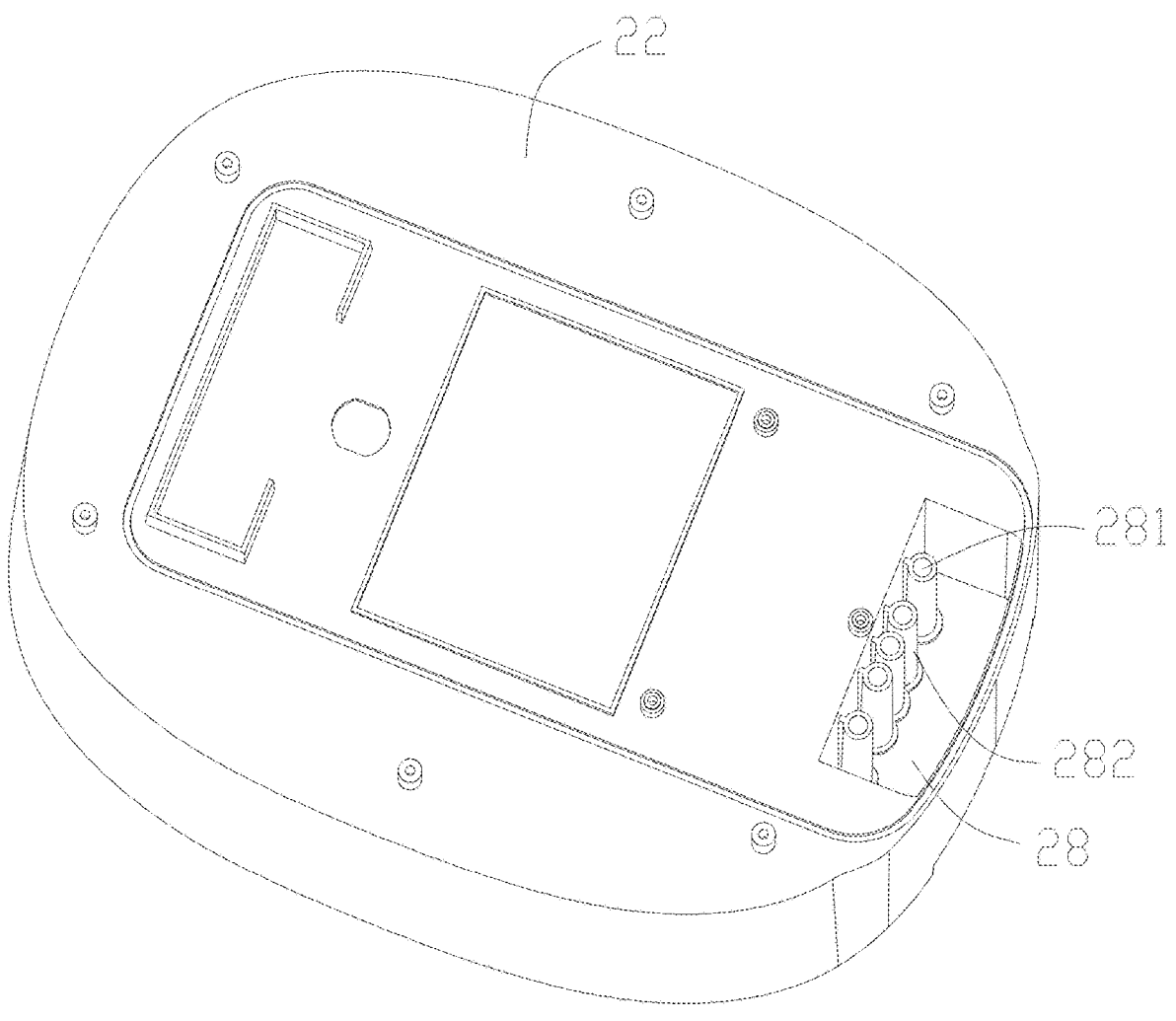
FIG. 9 is a structural view of the intermediate housing according to the present invention.

Referring to FIGS. 1 to 9, an ozone pet water dispenser 100 according to an embodiment of the present invention is disclosed.

The ozone pet water dispenser 100 includes a main body 2, a control host 1, a pump body 3, a heating unit 6 for heating the liquid in a storage chamber 24, and a hydrolytic ozone generator 4 for sterilizing the liquid in the storage chamber 24. The main body 2 is internally provided with the storage chamber 24 for storing liquid, and is further provided with a drinking trough 212 for holding liquid and a water return port 211 in communication with the drinking trough 212 and the storage chamber 24. The control host 1 includes a housing 11 assembled on the main body 2, and a first circuit board 15 and a switch unit 17 disposed on the housing 11. The switch unit 17 is electrically connected to the first circuit board 15. The pump body 3 is electrically connected to the first circuit board 15 and disposed on the main body 2, and the pump body 3 is activated when driven by the first circuit board 15 to draw water from the storage chamber 24 into the drinking trough 212. The heating unit 6 and the hydrolytic ozone generator 4 are electrically connected to the first circuit board 15 and disposed on the main body 2. The first circuit board 15 is configured to control at least one of the pump body 3, the heating unit 6, and the hydrolytic ozone generator 4 in response to operation of the switch unit 17.

Specifically, the hydrolytic ozone generator 4 is a low-voltage hydrolytic ozone generator. The low-voltage hydrolytic ozone generator employs low-voltage DC current to activate the solid-state membrane electrodes (both anode and cathode) to electrolyze deionized water. At the specialized anode solution interface, water molecules undergo proton exchange and dissociate into hydrogen and oxygen molecules, represented by the chemical equation: $2H_2O \rightarrow 2H_2 + O_2$. The hydrogen is directly released at the cathode interface, while the oxygen molecules at the anode interface acquire energy through electron excitation generated by high-density current and polymerize into ozone, as shown in the chemical equation: $3O_2 \rightarrow 2O_3$. This low-voltage hydrolysis method produces ozone with only oxygen and hydrogen as byproducts, completely free from nitrogen oxides (NOx) or other harmful substances.

The majority of pathogenic bacteria and microorganisms are anaerobic, such as *Helicobacter pylori*, an anaerobic pathogenic bacterium that grows in gingival areas and can cause digestive and gastrointestinal issues in infected pets. Another example is *Porphyromonas gingivalis*, an important anaerobic rod-shaped pathogenic bacterium in the oral cavity that can lead to periodontal problems in pets. Ozone possesses strong oxidative properties. When $O_3$ dissolves in water, it reacts with various biological molecules within bacterial, viral, and other microbial cells, thereby damaging and inhibiting the replication, proliferation, and growth of bacteria and microorganisms. This effectively kills harmful bacteria and suppresses the growth of detrimental microbes, achieving sterilization. Furthermore, due to pets' living habits, their mouths constantly carry pathogens, which are introduced into the water during each drinking instance. By dissolving ozone in the water, these pathogens can be eliminated, providing pets with sterile water. Additionally, unstable $O_3$ readily reverts to oxygen, increasing the dissolved oxygen content in the water, thereby allowing pets to consume clean water that is both oxygen-rich and sterile.

Moreover, prolonged consumption of water with low oxygen content, such as boiled water, may promote the proliferation of anaerobic bacteria in the gastrointestinal tract, leading to gradual deterioration of oxygen absorption functions in gastric and intestinal mucosa, which is detrimental to health. In contrast, the present embodiment provides pets with oxygen-enriched and sterile drinking water, which effectively enhances their metabolism and promotes overall health.

Accordingly, the present embodiment employs the hydrolytic ozone generator to produce ozone for sterilizing the liquid in the chamber while simultaneously increasing the dissolved oxygen content in the water. This provides pets with sterile, oxygen-enriched drinking water that significantly promotes their health. Compared to ultraviolet sterilization, the ozone-based disinfection demonstrates faster bactericidal action and achieves higher inactivation rates against bacterial spores and viruses, thereby improving sterilization efficiency and enabling more rapid water purification.

In the present embodiment, the ozone pet water dispenser 100 is equipped with the heating unit 6 for heating the liquid in the storage chamber 24, thereby preventing the dispenser from providing cold water to pets during winter that may cause gastrointestinal discomfort and improving the utilization rate of the ozone pet water dispenser 100. Furthermore, the embodiment incorporates the hydrolytic ozone generator 4 in the ozone pet water dispenser 100 to sterilize the liquid in the storage chamber 24, providing pets with purified water. Additionally, the control host 1 is independently arranged from the main body 2 to facilitate testing of the control host 1 and allow easy replacement when the first circuit board 15 becomes damaged. The embodiment also includes the pump body 3 and the water return port 211. When the pump body 3 operates, it draws liquid from the storage chamber 24 into the drinking trough 212. When the water level in the drinking trough 212 reaches a predetermined height, water flows back into the storage chamber 24 through the water return port 211, creating a circulating water flow that attracts pets to drink while ensuring they consume clean water.

Specifically, the hydrolytic ozone generator 4 is a compact low-voltage hydrolysis device capable of generating high-purity $O_3$ gas. For example, devices such as those manufactured by Ozon Systems GmbH of Stuttgart, Germany ($O_3$ Systems Company) may be employed.

In the present embodiment, the main body 2 may be provided with a temperature detection unit 12 for detecting either the liquid temperature in storage chamber 24 or the heating temperature of the heating unit 6. The temperature detection unit 12 is electrically connected to the first circuit board 15 to maintain the water in storage chamber 24 within a predetermined temperature range, thereby effectively preventing excessive or insufficient water temperatures. The temperature detection unit 12 may include a temperature sensor, thermistor, or similar device. In alternative embodiments without the temperature detection unit 12, the heating unit 6 temperature may be controlled during manufacturing of the ozone pet water dispenser 100 by regulating the power output to the heating unit 6.

In one embodiment, the main body 2 is provided with a first cavity 25 below the storage chamber 24, and the heating unit 6 is disposed within the first cavity 25. By positioning the heating unit 6 at the bottom of the storage chamber 24, the liquid in the storage chamber 24 can be heated from below during operation of the heating unit 6.

In one embodiment, the ozone pet water dispenser 100 further includes a battery 5 electrically connected to the first circuit board 15. The battery 5 is disposed within the first cavity 25 and positioned adjacent to the heating unit 6. The battery 5 supplies power to the first circuit board 15, eliminating the need for the ozone pet water dispenser 100 to rely on an external power supply through power cord 31, thereby preventing potential tripping hazards for pets and improving user experience. Specifically, the battery 5 is a rechargeable battery, and the housing 11 is provided with a charging port 18 electrically connected to the first circuit board 15. The charging port 18 is configured to connect to an external power source, and the first circuit board 15 processes the power received through the charging port 18 to charge the battery 5.

In one embodiment, the ozone pet water dispenser 100 further includes a second circuit board 7 electrically connected to the first circuit board 15. The heating unit 6, the hydrolytic ozone generator 4, and the battery 5 are all electrically connected to the second circuit board 7, with the battery 5 positioned on the side of the hydrolytic ozone generator 4 opposite to the heating unit 6. The second circuit board 7 is disposed within the first cavity 25. The inclusion of the second circuit board 7 facilitates electrical connections between the first circuit board 15 and each of the heating unit 6, the hydrolytic ozone generator 4, and the battery 5, while enabling more organized routing of conductive elements connecting these components to the first circuit board 15.

In one embodiment, a top portion of the main body 2 is provided with a first mounting slot 26, and at least a portion of the housing 11 is disposed within the first mounting slot 26 to enable the control host 1 to be assembled to the main body 2.

In one embodiment, an embedding protrusion 1131 is provided on an outer sidewall of the housing 11, and the main body 2 is provided with an embedding slot 216 on a sidewall of the first mounting slot 26 to receive the embedding protrusion 1131. The embedding protrusion 1131 is positioned within the embedding slot 216 when the housing 11 is assembled to the main body 2, thereby enabling detachable and stable mounting of the control host 1 to the main body 2. Alternatively, in other embodiments, the housing 11 may utilize magnetic attraction, snap-fit mechanisms, sliding grooves, or other detachable connections to achieve detachable connection with the main body 2.

In one embodiment, a probe 14 is disposed on the housing 11 and electrically connected to the first circuit board 15. A conductive pin 8 is disposed on the main body 2 at a position corresponding to the probe 14, where the conductive pin 8 is electrically connected to the second circuit board 7. The probe 14 is configured to contact the conductive pin 8 when the housing 11 is assembled into the first mounting slot 26. This allows for replacement of only the control host 1 when it is damaged and facilitates testing of the control host 1, thereby reducing the occupied volume during production and manufacturing testing of the ozone pet water dispenser 100.

In one embodiment, the main body 2 is further provided with a second cavity 28 adjacent to the storage chamber 24. The second cavity 28 is disposed between the first mounting slot 26 and the first cavity 25, and is positioned at one side of the storage chamber 24. The conductive pin 8 extends through the second cavity 28. By providing the second cavity 28 as a separate compartment for mounting the conductive pin 8, exposure of the conductive pin 8 to water can be effectively prevented.

In one embodiment, a first pillar 282 is disposed within the second cavity 28. A top end of the first pillar 282 extends to a surface of the main body 2 adjacent to the first mounting slot 26. The first pillar 282 is provided with a first limiting hole 281 in communication with both the first mounting slot 26 and the first cavity 25. One end of the conductive pin 8 passes through the first limiting hole 281 and is electrically connected to the second circuit board 7. A waterproof adhesive column 81 is formed between the first pillar 282 and the conductive pin 8 by potting. The waterproof adhesive column 81 prevents water ingress through the first limiting hole 281 into the first cavity 25, thereby providing a waterproof function.

In one embodiment, the control host 1 further includes an adapter board 16 positioned below and electrically connected to the first circuit board 15. The adapter board 16 is disposed within the housing 11, and the probe 14 is disposed on the adapter board 16. The housing 11 is provided with a second pillar 1132, the second pillar 1132 is provided with a second limiting hole 1133. A bottom portion of the housing 11 is provided with a first avoidance opening 1134 in communication with the second limiting hole 1133. The probe 14 passes through the second limiting hole 1133 and is disposed within the first avoidance opening 1134. The adapter board 16 serves as an intermediate connection for establishing electrical communication between the first circuit board 15 and the second circuit board 7, while reducing the cross-sectional footprint of the control host 1.

In one embodiment, the main body 2 includes an intermediate housing 11, a tray 21, and a first bottom shell 23. The tray 21 is detachably mounted on a top portion of the intermediate housing 11 to collectively form the storage chamber 24 and the first mounting slot 26. The first bottom shell 23 is disposed at a bottom portion of the intermediate housing 11 to form the first cavity 25 together with the intermediate housing 11. The second cavity 28 is disposed on the intermediate housing 11, with the drinking trough 212 and the water return port 211 formed on the tray 21. This configuration positions the second cavity 28 between the first mounting slot 26 and the first cavity 25, thereby creating a simplified structure that facilitates manufacturing of the main body 2. It also allows the second circuit board 7, the battery 5, and the heating unit 6 to be disposed within the first cavity 25, and enables installation of the hydrolytic ozone generator 4 on the intermediate housing 11 for sterilizing liquid in the storage chamber 24.

Specifically, the electrode pins of the positive and negative electrode plates on the hydrolytic ozone generator 4 may extend from the storage chamber 24 through the intermediate housing 11 into the first cavity 25 to electrically connect with the second circuit board 7, sealed with scaling rings or potting between the pins and the intermediate housing 11 to prevent liquid ingress from the storage chamber 24 into the first cavity 25. Alternatively, the positive and negative electrode plates of the hydrolytic ozone generator 4 may be electrically connected to the second circuit board 7 via wires that pass from the storage chamber 24 through the intermediate housing 11 into the first cavity 25, with the wires and intermediate housing 11 sealed using sealing rings or potting to block liquid entry from the storage chamber 24. As another option, a portion of the outer cover of the hydrolytic ozone generator 4 may extend from the storage chamber 24 through the intermediate housing 11 into the first cavity 25 to electrically connect with the second circuit board 7, with a sealing ring provided between the hydrolytic ozone generator 4 and the intermediate housing 11 to prevent liquid in the storage chamber 24 from entering the first cavity 25.

In one embodiment, a filter housing 29 is detachably mounted to a bottom portion of the tray 21, and the tray 21 and the filter housing 29 are connected to form a third cavity 290 in communication with the water return port 211. A filter module 9 to filter impurities is disposed within the third cavity 290, and the filter housing 29 is provided with a filter water outlet 292 in communication with both the third cavity 290 and the storage chamber 24. This configuration prevents impurities in the water flowing from the water return port 211 into the storage chamber 24, thus maintaining water quality in the storage chamber 24 and prolonging the service life of the pump body 3. Specifically, the filter module 9 may include one or more of: filter cotton, activated carbon, or ion exchange resin.

In one embodiment, a peripheral wall 213 extends downward from the bottom portion of the tray 21, and the filter housing 29 is detachably connected to the peripheral wall 213. The peripheral wall 213 is provided with a plurality of latch slots 217, while the filter housing 29 is provided with latch blocks 291 configured to engage with the latch slots 217. The latch blocks 291 are received within the latch slots 217 when the filter housing 29 is assembled with the peripheral wall 213, thereby achieving detachable connection between the filter housing 29 and the tray 21. This configuration facilitates user replacement of the filter module 9 and cleaning of both the peripheral wall 213 and filter housing 29. In alternative embodiments, the latch slots 217 may be disposed on the filter housing 29, with corresponding latch blocks 291 on the peripheral wall 213.

In one embodiment, each latch slot 217 has a numeral-"7"-shaped profile. The two latch slots 217 are arranged opposite each other and symmetrically about a central axis. This configuration enables stable assembly between the filter housing 29 and the tray 21, preventing detachment of the filter housing 29 from the peripheral wall 213 when the ozone pet water dispenser 100 is moved.

In one embodiment, the pump body 3 is disposed within the storage chamber 24 and positioned adjacent to a bottom portion of the storage chamber 24, enabling the pump body 3 to draw water from the bottom of the storage chamber 24. The housing 11 is provided with a docking port 13 electrically connected to the first circuit board 15. The pump body 3 is electrically connected to the docking port 13 via a power cable 31, with the docking port 13 positioned at an elevation higher than a maximum liquid level of the storage chamber 24 to prevent water ingress. This docking port configuration with the power cable 31 facilitates installation of the pump body 3.

In one embodiment, the pump body 3 is disposed within the storage chamber 24 and positioned adjacent to the bottom portion of the storage chamber 24, enabling the pump body 3 to draw water from the bottom portion of the storage chamber 24. The housing 11 is provided with a docking port 13 electrically connected to the first circuit board 15. The pump body 3 is electrically connected to the docking port 13 via a power cable 31, and the docking port 13 is positioned at an elevation higher than the maximum liquid level of the storage chamber 24 to thereby prevent water ingress. This configuration of the docking port 13 and the power cable 31 facilitates installation of the pump body 3.

In one embodiment, the housing 11 is provided with a detection unit 12 positioned above the main body 2 to be exposed for pet detection. The first circuit board 15 is configured to drive the pump body 3 to operate in response to a detection signal from the detection unit 12. Specifically, the detection unit 12 may include an infrared sensor, proximity sensor, ultrasonic sensor, and similar detection device, so that when a pet approaches, the detection unit 12 transmits the detection signal to the first circuit board 15.

In one embodiment, the main body 2 forms a protruding receiving platform 214 at a peripheral position. The housing 11 forms a protruding side platform 10 adjacent to the storage chamber 24, with the protruding side platform 10 positioned above the protruding receiving platform 214. This configuration positions at least a portion of the control host 1 above the main body 2 (elevated relative to the storage chamber 24), with the first circuit board 15 positioned above the main body 2 to effectively provide waterproof protection.

The detection unit 12 is disposed on a sidewall of the protruding side platform 10, positioning the detection unit 12 above the main body 2 to maintain exposure. This configuration enables the detection unit 12 to promptly detect pet proximity when a pet approaches the device. The first circuit board 15 activates the pump body 3 in response to electrical signals from the detection unit 12, thereby pumping water from the storage chamber 24 to the drinking trough 212.

The docking port 13 is disposed at a bottom portion of the protruding side platform 10. The protruding receiving platform 214 is provided with a second avoidance opening 215 at a position corresponding to the docking port 13, thereby positioning the docking port 13 above the liquid level in the storage chamber 24 to prevent water ingress into the housing 11 through the docking port 13. Optionally, a sealing ring may be provided between the docking port 13 and the housing 11 for enhanced waterproof protection.

In one embodiment, to facilitate the manufacturing process of the housing 11, the housing 11 includes a top shell 111, a second bottom shell 113 connected to the bottom portion of the top shell 111, and a receiving panel 112. The receiving panel 112 extends outward from the top portion of the second bottom shell 113 to contact the surface of the protruding receiving platform 214, with these components collectively forming the protruding side platform 10. The docking port 13 is positioned on the receiving panel 112, and the detection unit 12 is mounted on the sidewall of the top shell 111. The top shell 111 and second bottom shell 113 are detachably connected through either snap-fit engagements or interference fits.

In one embodiment, the switch unit 17 includes a water outlet switch 171 electrically connected to the first circuit board 15 for user operation. The first circuit board 15 is configured with three operational modes: sensor-activated mode (where the pump body 3 operates only when the detection unit 12 detects pet proximity), continuous flow mode (maintaining uninterrupted water delivery from the storage chamber 24 to the drinking trough 212), and intermittent flow mode (activating the pump body 3 at preset intervals, e.g., 30-minute cycles, with configurable durations such as 5, 10, or 20 minutes per cycle). Mode selection via the water outlet switch 171 triggers corresponding electrical signals to the first circuit board 15 to control the pump body 3.

In one embodiment, the switch unit 17 includes a sterilization control switch 172 electrically connected to the first circuit board 15 for user operation. The first circuit board 15 is configured with four sterilization modes: manual sterilization, sterilization at 30-minute intervals, sterilization at 60-minute intervals, and sterilization at 120-minute intervals. The user selects modes via the sterilization control switch 172, and the first circuit board 15 switches modes based on the electrical signals from the switch. For manual sterilization mode, the switch unit 17 includes a sterilization activation switch 173 electrically connected to the first circuit board 15. When operated, the first circuit board 15 drives the hydrolytic ozone generator 4 to activate or deactivate based on the switch's electrical signals. In timed interval modes (30-minute/60-minute/120-minute), the first circuit board 15 periodically activates the hydrolytic ozone generator 4 for a preset duration (e.g., 10 minutes) at the selected intervals-operating for the duration, then deactivating until the next cycle begins. The duration is configurable (e.g., 15 or 20 minutes), and additional interval options (e.g., 3-hour or 6-hour cycles) may be implemented for sterilizing liquid in the storage chamber 24.

Specifically, the water outlet switch 171, sterilization control switch 172, and sterilization activation switch 173 may each include a push-button switch, touch-sensitive switch, or equivalent switching mechanism.

As described above, one or more embodiments are provided in conjunction with the detailed description, The specific implementation of the present invention is not confirmed to be limited to that the description is similar to or similar to the method, the structure and the like of the present invention, or a plurality of technical deductions or substitutions are made on the premise of the conception of the present invention to be regarded as the protection of the present invention.

What is claimed is:

1. An ozone pet water dispenser, comprising:

a main body, wherein the main body is internally provided with a storage chamber for storing liquid, and the main body is provided with a drinking trough for holding liquid and a water return port in communication with the drinking trough and the storage chamber;

a control host, comprising a housing assembled on the main body, and a first circuit board and a switch unit disposed on the housing, wherein the switch unit is electrically connected to the first circuit board;

a pump body disposed on the main body, wherein the pump body is electrically connected to the first circuit board, and the pump body is activated when driven by the first circuit board to draw water from the storage chamber into the drinking trough;

a heating unit for heating liquid in the storage chamber, wherein the heating unit is electrically connected to the first circuit board and disposed on the main body; and a hydrolytic ozone generator for sterilizing the liquid in the storage chamber, wherein the hydrolytic ozone generator is electrically connected to the first circuit board and disposed on the main body, and the first circuit board is configured to control at least one of the pump body, the heating unit, and the hydrolytic ozone generator in response to operation of the switch unit;

wherein the pump body is disposed within the storage chamber and positioned adjacent to a bottom portion of the storage chamber, the housing is provided with a docking port electrically connected to the first circuit board, the pump body is electrically connected to the docking port via a power cable, and the docking port is positioned at an elevation higher than a maximum liquid level of the storage chamber.

2. The ozone pet water dispenser according to claim 1, wherein the hydrolytic ozone generator is a low-voltage hydrolytic ozone generator.

3. The ozone pet water dispenser according to claim 1, wherein the main body is provided with a first cavity below the storage chamber, and the heating unit is disposed within the first cavity.

4. The ozone pet water dispenser according to claim 3, further comprising a battery electrically connected to the first circuit board, wherein the battery is disposed within the first cavity and positioned adjacent to the heating unit.

5. The ozone pet water dispenser according to claim 1, wherein the housing is provided with a detection unit, the first circuit board is configured to drive the pump body to operate in response to a detection signal from the detection unit, and the detection unit is positioned above the main body.

6. The ozone pet water dispenser according to claim 5, wherein the main body forms a protruding receiving platform at a peripheral position; the housing forms a protruding side platform adjacent to the storage chamber, and the protruding side platform is positioned above the protruding receiving platform; the detection unit is disposed on a sidewall of the protruding side platform, and the docking port is disposed at a bottom portion of the protruding side platform; the protruding receiving platform is provided with a second avoidance opening at a position corresponding to the docking port.

7. The ozone pet water dispenser according to claim 6, wherein the housing comprises a top shell, and a second bottom shell and a receiving panel both connected to a bottom portion of the top shell, the receiving panel extends outward from a top portion of the second bottom shell, the receiving panel contacts a surface of the protruding receiving platform, the docking port is disposed on the receiving panel, and the detection unit is disposed on a sidewall of the top shell.

8. The ozone pet water dispenser according to claim 1, wherein the switch unit comprises a water outlet switch electrically connected to the first circuit board and configured for user operation, and the first circuit board is configured to operate the pump body in either a continuous mode or an intermittent mode at predetermined time intervals in response to an electrical signal from the water outlet switch.

9. The ozone pet water dispenser according to claim 1, wherein the switch unit comprises a sterilization control switch electrically connected to the first circuit board and configured for user operation, and the first circuit board is configured to activate the hydrolytic ozone generator to operate in either a continuous sterilization mode or a periodic sterilization mode at predetermined time intervals in response to an electrical signal from the sterilization control switch.

10. An ozone pet water dispenser, comprising:
a main body, wherein the main body is internally provided with a storage chamber for storing liquid, and the main body is provided with a drinking trough for holding liquid and a water return port in communication with the drinking trough and the storage chamber;
a control host, comprising a housing assembled on the main body, and a first circuit board and a switch unit disposed on the housing, wherein the switch unit is electrically connected to the first circuit board;
a pump body disposed on the main body, wherein the pump body is electrically connected to the first circuit board, and the pump body is activated when driven by the first circuit board to draw water from the storage chamber into the drinking trough;
a heating unit for heating liquid in the storage chamber, wherein the heating unit is electrically connected to the first circuit board and disposed on the main body; and
a hydrolytic ozone generator for sterilizing the liquid in the storage chamber, wherein the hydrolytic ozone generator is electrically connected to the first circuit board and disposed on the main body, and the first circuit board is configured to control at least one of the pump body, the heating unit, and the hydrolytic ozone generator in response to operation of the switch unit;
wherein the main body is provided with a first cavity below the storage chamber, and the heating unit is disposed within the first cavity;
the ozone pet water dispenser further comprises a battery electrically connected to the first circuit board, wherein the battery is disposed within the first cavity and positioned adjacent to the heating unit;
the ozone pet water dispenser further comprises a second circuit board electrically connected to the first circuit board, wherein the heating unit, the hydrolytic ozone generator, and the battery are all electrically connected to the second circuit board, the battery is positioned on a side of the hydrolytic ozone generator opposite to the heating unit and the second circuit board is disposed within the first cavity.

11. The ozone pet water dispenser according to claim 10, wherein a top portion of the main body is provided with a first mounting slot, and at least a portion of the housing is disposed within the first mounting slot.

12. The ozone pet water dispenser according to claim 11, wherein an embedding protrusion is provided on an outer sidewall of the housing; the main body is provided with an embedding slot on a sidewall of the first mounting slot configured to receive the embedding protrusion; and the embedding protrusion is positioned within the embedding slot when the housing is assembled to the main body.

13. The ozone pet water dispenser according to claim 11, wherein a probe is disposed on the housing and electrically connected to the first circuit board; a conductive pin is disposed on the main body at a position corresponding to the probe, the conductive pin is electrically connected to the second circuit board, and the probe is configured to contact the conductive pin when the housing is assembled into the first mounting slot.

14. The ozone pet water dispenser according to claim 13, wherein the main body is further provided with a second cavity adjacent to the storage chamber; the second cavity is disposed between the first mounting slot and the first cavity; the second cavity is positioned at one side of the storage chamber; and the conductive pin extends through the second cavity.

15. The ozone pet water dispenser according to claim 14, wherein a first pillar is disposed within the second cavity; a top end of the first pillar extends to a surface of the main body adjacent to the first mounting slot; the first pillar is provided with a first limiting hole in communication with the first mounting slot and the first cavity; one end of the conductive pin passes through the first limiting hole and is electrically connected to the second circuit board; and a waterproof adhesive column is formed between the first pillar and the conductive pin by potting.

16. The ozone pet water dispenser according to claim 13, wherein the control host further comprises an adapter board positioned below and electrically connected to the first circuit board, the adapter board is disposed within the housing, and the probe is disposed on the adapter board;
the housing is provided with a second pillar, the second pillar is provided with a second limiting hole, a bottom portion of the housing is provided with a first avoidance opening in communication with the second limiting hole, the probe passes through the second limiting hole and is disposed in the first avoidance opening.

17. The ozone pet water dispenser according to claim 14, wherein the main body comprises an intermediate housing, a tray and a first bottom shell, the tray is detachably mounted on a top portion of the intermediate housing, and the tray and the intermediate housing are connected to form the storage chamber and the first mounting slot; the first bottom shell is disposed at a bottom portion of the intermediate housing, and the first bottom shell and the intermediate housing are connected to form the first cavity; the second cavity is disposed on the intermediate housing, and the drinking trough and the water return port are provided on the tray.

18. The ozone pet water dispenser according to claim 17, wherein a filter housing is detachably mounted to a bottom portion of the tray, the tray and the filter housing are connected to form a third cavity in communication with the water return port, a filter module for filtering impurities is disposed within the third cavity, and the filter housing is provided with a filter water outlet in communication with both the third cavity and the storage chamber.

19. The ozone pet water dispenser according to claim 18, wherein a peripheral wall extends downward from the bottom portion of the tray, the filter housing is detachably connected to the peripheral wall; the peripheral wall is provided with two latch slots, the filter housing is provided with latch blocks configured to engage with the latch slots, the latch blocks are received within the latch slots when the filter housing is assembled with the peripheral wall; each latch slot has a numeral-"7"-shaped profile; the two latch slots are arranged opposite each other and symmetrically about a central axis.

* * * * *